US007006443B2

(12) United States Patent
Storr

(10) Patent No.: US 7,006,443 B2
(45) Date of Patent: Feb. 28, 2006

(54) MULTICAST FLOW CONTROL

(75) Inventor: Morten Storr, Farum (DK)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 10/665,887

(22) Filed: Sep. 19, 2003

(65) Prior Publication Data

US 2004/0062202 A1 Apr. 1, 2004

Related U.S. Application Data

(63) Continuation of application No. 09/276,374, filed on Mar. 25, 1999, now Pat. No. 6,633,543.

(60) Provisional application No. 60/098,093, filed on Aug. 27, 1998.

(51) Int. Cl.
H04L 12/26 (2006.01)

(52) U.S. Cl. .............................. 370/236.1; 370/395.71

(58) Field of Classification Search ........ 370/412–413, 370/401, 395.4, 395.1, 397, 391, 390, 235, 370/233, 231, 230
See application file for complete search history.

(56) References Cited

U.S. PATENT DOCUMENTS

| | | | |
|---|---|---|---|
| 5,428,611 A | 6/1995 | Jain et al. | |
| 5,477,540 A | 12/1995 | Yang et al. | |
| 5,491,801 A | 2/1996 | Jain et al. | |
| 5,537,413 A | 7/1996 | Yang et al. | |
| 5,557,607 A | 9/1996 | Holden | |
| 5,572,522 A | 11/1996 | Calamvokis et al. | |
| 5,633,859 A | 5/1997 | Jain et al. | |
| 5,668,951 A | 9/1997 | Jain et al. | |
| 5,675,576 A | 10/1997 | Kalampoukas et al. | |
| 5,675,742 A | 10/1997 | Jain et al. | |
| 5,732,087 A | 3/1998 | Lauer et al. | |
| 5,805,577 A | 9/1998 | Jain et al. | |
| 5,898,669 A | 4/1999 | Shimony et al. | |
| 5,898,670 A | 4/1999 | Hoebeke et al. | |
| 6,134,218 A | 10/2000 | Holden | |
| 6,137,779 A * | 10/2000 | Miller et al. ................. | 370/236 |
| 6,151,303 A | 11/2000 | Arutaki | |
| 6,163,542 A | 12/2000 | Carr et al. | |
| 6,278,714 B1 | 8/2001 | Gupta | |
| 6,298,042 B1 * | 10/2001 | Murase et al. ............... | 370/235 |
| 6,633,543 B1 * | 10/2003 | Storr ........................ | 370/236.1 |
| 6,643,264 B1 * | 11/2003 | Furusawa et al. ......... | 370/236.1 |

\* cited by examiner

Primary Examiner—Duc Ho
Assistant Examiner—Phuongchau Ba Nguyen
(74) Attorney, Agent, or Firm—Fish & Richardson P.C.

(57) ABSTRACT

An information cell transmission method includes receiving flow control cells at a switch from a collection of multicast virtual circuits and aggregating the flow control cells to form an aggregate flow control cell. A network switch includes first and second port circuitry and control circuitry. The first port circuitry is operative to exchange flow control cells on a collection of multicast virtual circuits coupling the switch to destination nodes. The second port circuitry is operative to exchange flow control cells on another virtual circuit that couples the switch to a source node. The control circuitry is operatively couples the collection of multicast virtual circuits to the source virtual circuit via the first and second port circuitry. The control circuitry includes circuitry to receive the flow control cells from the first port circuitry, circuitry to aggregate the first flow control cell data to form an aggregate flow control cell, and circuitry to send the aggregate flow control cell to the second port circuitry for transmission over the source virtual circuit toward the source node.

24 Claims, 3 Drawing Sheets

MULTICAST FLOW CONTROL

The present application is a continuation of and claims benefit of U.S. patent application Ser. No. 09/276,374, filed Mar. 25, 1999 now U.S. Pat. No. 6,633,543, which claims priority from U.S. Provisional Application Ser. No. 60/098,093, filed Aug. 27, 1998. The disclosure of the prior application is considered part of (and is incorporated by reference in) the disclosure of this application.

BACKGROUND INFORMATION

Asynchronous transfer mode (ATM) data transfer is a communication technology in which fixed-size packets of data, known as "cells," are transferred between ATM switching devices ("switches"). ATM switches may be thought of as circuit oriented, low-overhead packet switches providing virtual circuits. The virtual circuits provide the basis for both switching and multiplexed transmission. Asynchronous time division (ATD) and fast packet switching are alternate terms which have been employed to describe similar transfer technology.

ATM networks transfer information using a cell format that typically conforms to formats adopted by the International Telecommunications Union (ITU). ITU-standard ATM cells have a 5-byte header field and a 48-byte payload field. The header field carries information pertaining to the transport and routing of an ATM cell through switching equipment in a communications network. The payload field is available to transfer user-data. User-data may be digitized video or audio, data from a computer application, or information provided by a higher layer communication protocol.

ATM cells are sent from originating network access equipment, typically located at a customer's premises, to an ATM network and from the ATM network to destination network access equipment, typically located at a second customer's premises. The ATM network provides end-to-end routing of the ATM cells.

SUMMARY

In general, in one aspect, the invention features an information cell transmission method. The method includes receiving flow control cells at a switch from a collection of multicast virtual circuits and aggregating the flow control cells to form an aggregate flow control cell.

Implementations may include one or more of the following features. Resource management data, such as BRM cell explicit rate data, may be calculated by processing rate control data in each flow control cell using a traffic rate control algorithm. The calculated resource management data may then be stored in a database record associated with the virtual circuit on which the flow control cell was received. Each of the virtual circuits may operatively couple the switch to a destination node. A flow control cell traveling in a forward direction may be received from a source virtual circuit and sent over each virtual circuit in the collection toward a destination node, and the aggregate flow control cell may be sent in a backward direction from the switch over the source virtual circuit toward a source node. The aggregate flow control cell may be sent when a cell counter is above a threshold value. The counter may be incremented when a flow control cell is received at the switch in a forward direction and decremented when the aggregate flow control cell is sent from the switch in a backward direction.

In general, in another aspect, the invention features a network switch. The network switch includes first and second port circuitry and control circuitry. The first port circuitry is operative to exchange flow control cells on a collection of virtual circuits coupling the switch to destination nodes. The second port circuitry is operative to exchange flow control cells on another virtual circuit that couples the switch to a source node. The control circuitry is operatively coupled to the first and second port circuitry. The control circuitry includes circuitry to receive the flow control cells from the first port circuitry, circuitry to aggregate the first flow control cell data to form an aggregate flow control cell, and circuitry to send the aggregate flow control cell to the second port circuitry for transmission toward the source node.

Implementations may include one or more of the following features. The control and/or aggregation circuitry may include a memory having locations to store data received in flow control cells. Each of the memory locations in the aggregation circuitry may be associated with a predetermined one of the virtual circuits served by the first port circuitry. The switch may include multicasting circuitry coupling the first and second port circuitry to each other and configured to receive a cell from the second port circuitry and to send the cell over each of the collection of virtual circuits. The first port circuitry may include circuitry to transmit and receive data cells over multiple physical links. Virtual circuits served by both the first and second port circuitry may share a single physical link or may be on different physical links. The control circuitry may include counter circuitry configured to increment a count when a flow control cell is received in a forward direction from a virtual circuit and to decrement the count when the aggregate flow control cell is transmitted in a backward direction on that virtual circuit. The control circuitry may include circuitry to transmit an aggregate flow control cell only when the count is above a threshold value.

In general, in another aspect, the invention features a network switch including port circuitry, switching circuitry, and control circuitry. The port circuitry is configured to exchange cells on a collection of virtual circuits. The switching circuitry is operatively coupled to the port circuitry to receive cells from a first one of the virtual circuits and to transmit the cells from the first virtual circuit on a group of second virtual circuits. The control circuitry is operatively coupled to the switching circuitry to receive flow control cells from the second virtual circuits, to aggregate data in the flow control cells, and to send the aggregated data over the first virtual circuit in an aggregate flow control cell.

The details of one or more embodiments of the invention are set forth in the accompanying drawings and the description below. Implementations may provide advantages such as improved control over ATM network cell traffic. Other features, objects, and advantages of the invention will be apparent from the description and drawings, and from the claims.

DETAILED DESCRIPTION

In an ATM network, fixed-size packets of data, known as "cells," are transferred between ATM switching devices ("switches"). An ATM cell includes a virtual circuit identifier (VCI) and virtual path identifier (VPI) that identifies a bi-directional route (a "virtual circuit") between ATM network switches. Virtual circuits (also referred to as "virtual channels") provide the basis for both switching and multiplexed transmission. Routing of data frames between LAN nodes can be achieved by identifying a virtual circuit and/or virtual path in the data frame's route designation information, converting the data frame to ATM cells, routing the cells through an ATM network using the identified virtual circuit and/or virtual path, and reassembling the cell into a data frame prior to delivery of the data frame to its destination. The use of an ATM network in the routing of data frames may be transparent to the LAN nodes generating the data frame.

Figure 1:
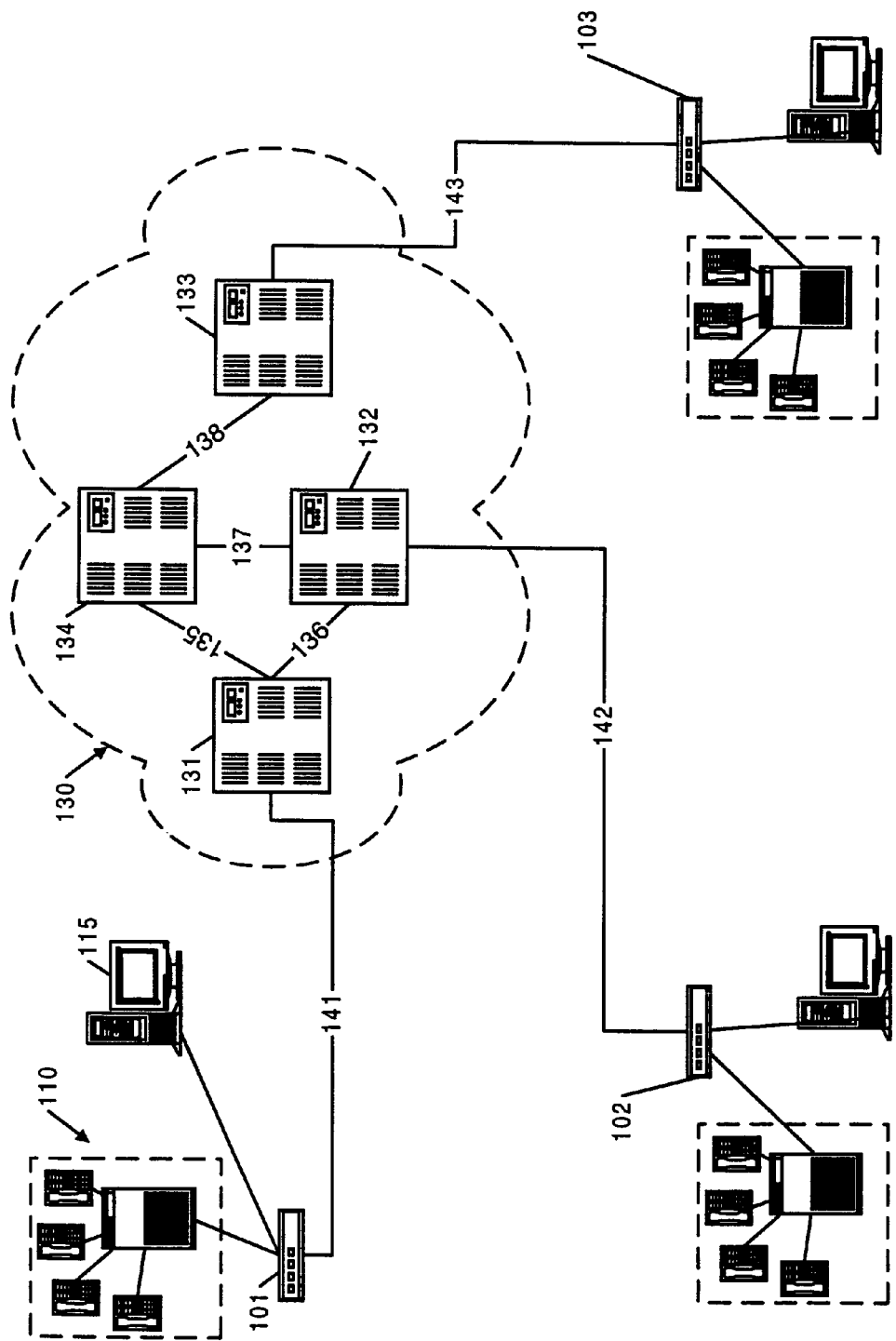
FIG. 1 shows local area networks interconnected by an ATM network.

FIG. 1 is an exemplary ATM network. ATM cells can be used to establish a communication path between network access equipment 101–103. Network access equipment 101–103 forms the originating and terminating points in an ATM communication and may convert non-ATM data traffic into an ATM format. Conversion of non-ATM data traffic to ATM cells is provided by ATM adaptation layer (AAL) services. Standard AAL services are defined in Bellcore publication GR-1113-CORE, *Asynchronous Transfer Mode and ATM Adaptation Layer (AAL) Protocols,* 1994. AAL services may be used to convert data carried by continuous bit rate (CBR) circuit-oriented data connections into ATM cells sent over a virtual circuit connection or to convert variable-length packet data traffic originating on a local area network (LAN) into ATM cells for transport on an ATM network. ATM cells are sent from network access equipment to the ATM network using a user-network interface header 125 (FIG. 2B, discussed below).

Network access equipment 101–103 may combine data from multiple sources. For example, data from a LAN 110 and circuit oriented traffic, such as a T1 connection from a private branch exchange phone system (PBX) 115, may each be converted to ATM cells at network access equipment 101 and the resulting ATM cells then are multiplexed over a trunk interface 141. VPI and VCI information transmitted in ATM cells is used to uniquely identify data sources and destinations at network access equipment 101 and at switches 131–134 within the ATM network 130. By assigning a unique VPI/VCI value to ATM cells transporting LAN 110 data and different VPI/VCI value to cells transporting PBX 115 data, independent routing and logical separation of the PBX 110 and LAN 115 data can be maintained.

ATM cells originating at network access equipment 101–103 are sent over trunks 141–143 to the ATM network 130. Trunk interfaces 141–143 can include 45 Mbit/second T-3 interfaces, 155 Mbit/second fiber optic synchronous optical network optical carrier level 3 concatenated data (SONET OC-3c) interfaces, other SONET links, wireless carrier systems, and/or other physical layer data transmission technologies.

In a standards-compliant ATM network, ATM cells having a 53-byte format are used to communicate between the access units 101–103 and the ATM network 130. ATM cell format have been standardized by the International Telecommunications Union (ITU). ITU-standard ATM cells have a 5-byte header field and a 48-byte payload field. The header field carries information pertaining to the transport and routing of an ATM cell through the switching equipment in a communications network. The payload field is available to transfer user-data.

Figure 2A:
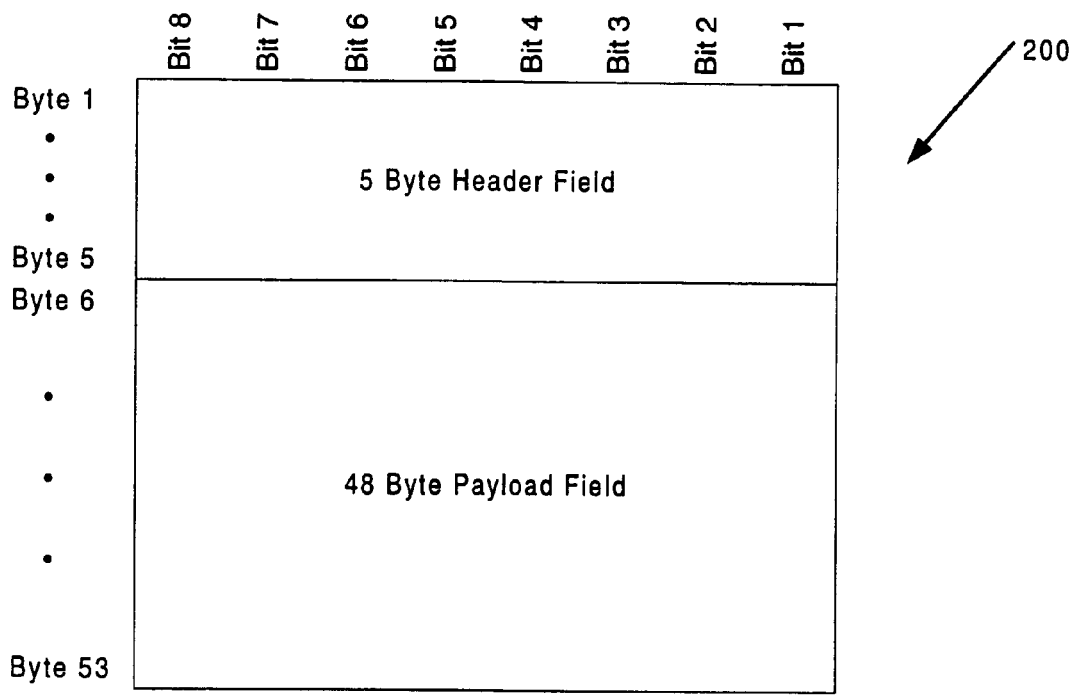
FIGS. 2A, 2B, and 2C are data diagrams of an ATM cell.
Figure 2B:
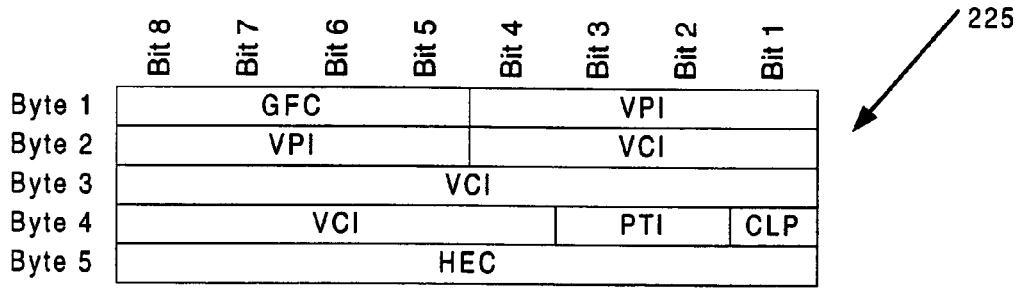
Figure 2C:
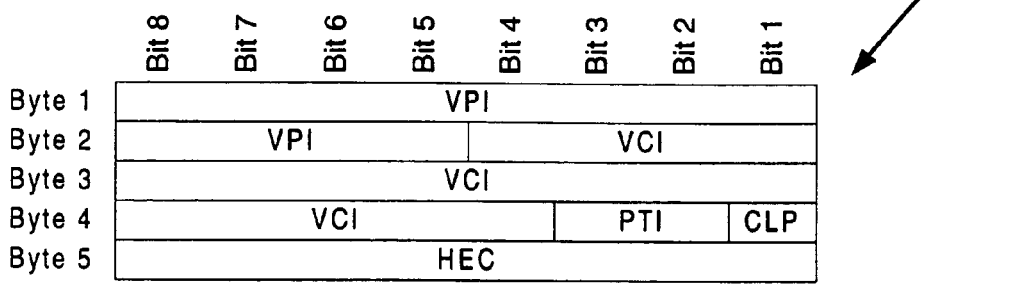

FIG. 2A represents an ITU-standard 53-byte ATM cell format. The ATM cell 200 includes a header field 201 and a payload field 202. The header field 201 may be either a user-network interface header 225 (FIG. 2B) or a network-network interface header 250 (FIG. 2C). In general, ATM cells having a user-network interface header 225 are sent between ATM network access units that are located at endpoints of an ATM connection and ATM network switching equipment. ATM cells with user-network headers may be sent between access units 101–103 and switches 131–133, respectively. Cells having a network-network interface header 250 are sent between ATM switches 131–134 in the ATM network, i.e., from non-endpoint to non-endpoint ATM cell switching equipment. User-network interface headers 225 and network-network interface headers 250 include multiple information sub-fields and differ in the information contained in the first byte ("Byte 1") of cell header 225 and cell header 250.

A user-network header 225 includes a four-bit generic flow control (GFC) field, an eight-bit virtual path identifier (VPI) field, a sixteen-bit virtual circuit identifier (VCI) field, a three-bit payload type identifier (PTI) field, a one-bit cell loss priority (CLP) field and an eight-bit header error control (HEC) field. The GFC field carries information to assist in controlling the flow of ATM cells over the user-network interface. The VPI field identifies a virtual path and the VCI field identifies the virtual circuit for routing the ATM cell through a network. The PTI field identifies whether the cell contains user or network management related information. The CLP field indicates the cell loss priority. If the value of the CLP field is 1, the cell may be subject to discard, depending on network conditions such as a network overload. If the value of the CLP field is 0, the cell has high priority and therefore ATM switches will attempt to allocate sufficient network resources to prevent cell discard and ensure transport of the cell. The HEC field contains header error control information to detect transmission errors in header 201 information. Additional information on these standard header fields can be found in *ATM User-Network Interface Specification Version* 3.1, ATM Forum, 1994.

A network-network header 250, has VCI, PTI, CLP, and HEC fields with the same bit size and functionality as corresponding fields in the user-network header 225. However, since generic flow control information is not used between switches in an ATM network, the network-network header does not include a GFC field. Additionally, the network-network header has a twelve-bit VPI field allowing a larger VPI address space than is available in a user-network header.

In an ATM network, a VPI/VCI value in a cell header is used to route a cell between the switching ports of two connected ATM switches, but the VPI/VCI value does not provide for routing through multiple switches. To route a cell from one endpoint to another endpoint through multiple switches in an ATM network, VPI/VCI information must be translated at each switch. Thus, to route an ATM cell, an ATM switch performs the following steps: 1) an incoming cell's VPI/VCI information is read, 2) a switch output port providing cell transport to a next node is determined based on the VPI/VCI information in the incoming cell's header; 3) the switch replaces the cell's VPI/VCI information with new VPI/VCI information for routing through the destination switch, and 4) the switch forwards the cell through the determined output port to the next node. Each switch along the cell's path repeats this process until the cell reaches its final destination.

As an example, consider an ATM cell that is to be transmitted from network access unit 101 is to network access unit 103. The cell may traverse a path from access unit 101 to switch 131 then through ATM switch 132, switch 134, switch 133 and finally to access unit 103. Prior to transmission of ATM cells from access unit 101 to 103, VPI/VCI translation information is established at each point in the path between 101 and 103 through a preliminary set-up process. VPI/VCI translation information may be established by exchanging special ATM cells providing information to control processors in the various network switches or to control processors in a network management system. Next, at network access unit 101, cells are formatted with user-network interface headers and are assigned a VPI/VCI value.

In general, VPI/VCI values are meaningful at a single switch along an end-to-end path through the ATM network. Thus, VPI/VCI values assigned by the access unit 101 allow routing between input and output ports of switch 131, but those values may not properly route the cell through switches 132–134 or through access unit 103. To enable routing along the entire end-to-end path, each ATM switch maintains a translation table used to track and translate (reassign) a cell's VPI/VCI values as the cell is transported through the switch. To transport an ATM cell between access unit 101 and 103 on a path through switches 131, 132, 134, 133, VPI/VCI translation information is established at each point in the path between 101 and 103. When the cell originating at access unit 101 is received at the switch 131, the VPI/VCI information in the user-network interface header allows routing to the proper output port on the switch 131 and, prior to the cell exiting the switch 131 through that output port, the VPI/VCI information is replaced with new VPI/VCI information to allow routing through switch 132. The process of determining an output port and replacing VPI/VCI information may be repeated at each switch along the end-to-end path.

A class of service is associated with each ATM connection when the connection is established. In an ATM network based on ATM Forum standards, four classes of service have been defined. The first class, constant bit rate (CBR) specifies a fixed data rate connection. Switches in the ATM network 130 must reserve sufficient capacity to ensure that the specified data rate can be provided and may monitor incoming traffic to ensure that the connection from the user does not exceed the specified capacity. The second service class, variable bit rate (VBR) identifies both a sustained (nominal) and burst rate. In general, a VBR service will provide data at a specified nominal rate but may increase its data rate up to a specified maximum during periods of peak traffic. A third class, unspecified bit rate (UBR), may be characterized to as a best-effort service. UBR connections do not guarantee network capacity, and may result in cell discard. Finally, a fourth class, available bit rate (ABR) guarantees a minimum capacity and, when additional network capacity is available, allows bursts above the minimum rate without risk of cell loss.

ABR and UBR connections are commonly used for LAN internetworking and other types of data traffic. UBR is directed at delay-tolerant applications and provides for no feedback or control over network congestion. ABR is commonly used for applications having particular delay bounds that should be obeyed. An application using ABR specifies a peak cell rate (PCR) that it will use and a minimum cell rate (MCR) that it requires. The network 130 allocates resources so that all ABR connections receive at least their MCR capacity. Any unused capacity may be shared among all ABR sources.

To control traffic on ABR connections, a feedback mechanism is used so that ABR traffic does not exceed the available network capacity. Feedback can be provided through the use of forward resource management (FRM) and backward resource management (BRM) cells. FRM and BRM cells are multiplexed along with data cells over an ATM virtual connection. Typically, one FRM cell is transmitted from a source toward a destination for every N data cells (a commonly used value of N is thirty one). Each FRM cell contains, among other things, a congestion indicator (CI) field, a no-increase (NI) field, and an explicit rate (ER) field. The source typically sets CI to indicate no congestion (CI=0), the no-increase field to "1" if a rate increase is desired or to "0" otherwise, and the sub-parameters of the ER field to indicate a desired transmission rate in a range between the initial cell rate (ICR) for the connection and the peak cell rate (PCR) for the connection. As each FRM cell is received at its final destination, it is turned around and transmitted back to the source as a BRM cell. The destination system and/or any other ATM switch along the virtual connection may change the CI, NI, and ER field in the BRM cell in order to specify the transmission rate constraints that the source should adhere to. Resource management cells are more fully described in *Traffic Management Specification Version* 4.0, Document # af-tm-0056.000, The ATM Forum Technical Committee, April 1996.

An ATM switch may provide rate-control feedback in a number of ways, allowing congestion to be detected and reported at a number of points along a virtual connection. For example, a switch can set the explicit forward congestion indication (EFCI) condition in an ATM data cell header (using the payload type field) being transmitted in a forward direction to indicate congestion. In response, the destination system may set the congestion indicator (CI) bit in the BRM cell to indicate congestion. A switch also may directly set the CI or NI bit of a forward or backward resource management cell. If the CI bit in a FRM cell is set to indicate congestion, or the NI bit in the FRM cell is set to indicate "no-increase," then such a set bit will remain set in a returned BRM cells. Additionally, a switch can modify ER field value in a FRM or BRM cell to indicate a desired transmission rate.

ATM switches may support multicast connections. A multicast connection allows a data stream received over a virtual circuit from a source node (a "source virtual circuit") to be sent over virtual circuits to multiple destination nodes ("destination virtual circuits"). Similarly, data cells returned from the destination nodes over the destination virtual circuits can be multiplexed over the source virtual circuit and sent back toward the source node. To establish a multicast connection, the source virtual circuit is set up between the source node and a multicasting switch and a separate destination virtual circuit is set up between the multicasting switch and each destination node. For example, if ATM cells are to be sent from a source node to three destination nodes, the source node establishes a source virtual circuit with the multicasting switch and the multicasting switch establishes one destination virtual circuit per destination node, for a total of three destination virtual circuits. As ATM cells arrive over the source virtual circuit, copies of the cells are transmitted on each of the destination virtual circuits.

Multicasting may be repeated at multiple points in the ATM network. A first multicasting switch may multicast cells over multiple destination virtual circuits including a destination virtual circuit to a second multicasting switch. The destination virtual circuit from the first multicasting switch to the second multicasting switch acts as a source virtual circuit for the second multicasting switch. In turn, the second multicasting switch may multicast the received cells over a second set of multicast destination virtual circuits.

Each multicasting switch maintains VPI/VCI or other information to associate source virtual circuit with their multicast destination virtual circuits.

The use of multicast virtual circuits can provide advantages when data is to be distributed to multiple destinations. For example, a physical link connecting a source node to an ATM network may not have adequate capacity to sustain individual virtual circuits to multiple destination nodes. Multicasting allows multiple destination nodes to be served while allowing the source node to use a physical link that would not otherwise have adequate capacity to carry the total cell traffic being delivered.

If an ABR service is multicast, FRM cells will be replicated at multicasting switches and sent over each destination virtual circuit. At each destination node, the received FRM cells will be turned around and transmitted back to the source node as BRM cells. As a result, an excessive number of BRM cells may be directed toward a source node. If the number of BRM cells grows excessive, the BRM cells may use excessive network bandwidth and may cause resource management processors in the ATM network to be overwhelmed. Furthermore, BRM cells from different destination virtual circuits may transport differing resource management information depending on capacities of destination nodes served by the virtual circuit, handling of the virtual circuit at other switches, and the physical link on which the virtual circuit is transported. Thus, various BRM cells may include inconsistent resource management information. BRM cells being returned from destination nodes served by a lightly used physical link may indicate that the source can increase its data rate, while BRM cells returned from destinations served by heavily used links may indicate that the source should reduce its data rate. Inconsistent resource management data in BRM cells may result in over or under utilization of network links and unreliable data transmission. Thus, advantages may be gained by regulating the number and/or contents of BRM cells returned toward a source node from a collection of multicast virtual circuits.

Figure 3:
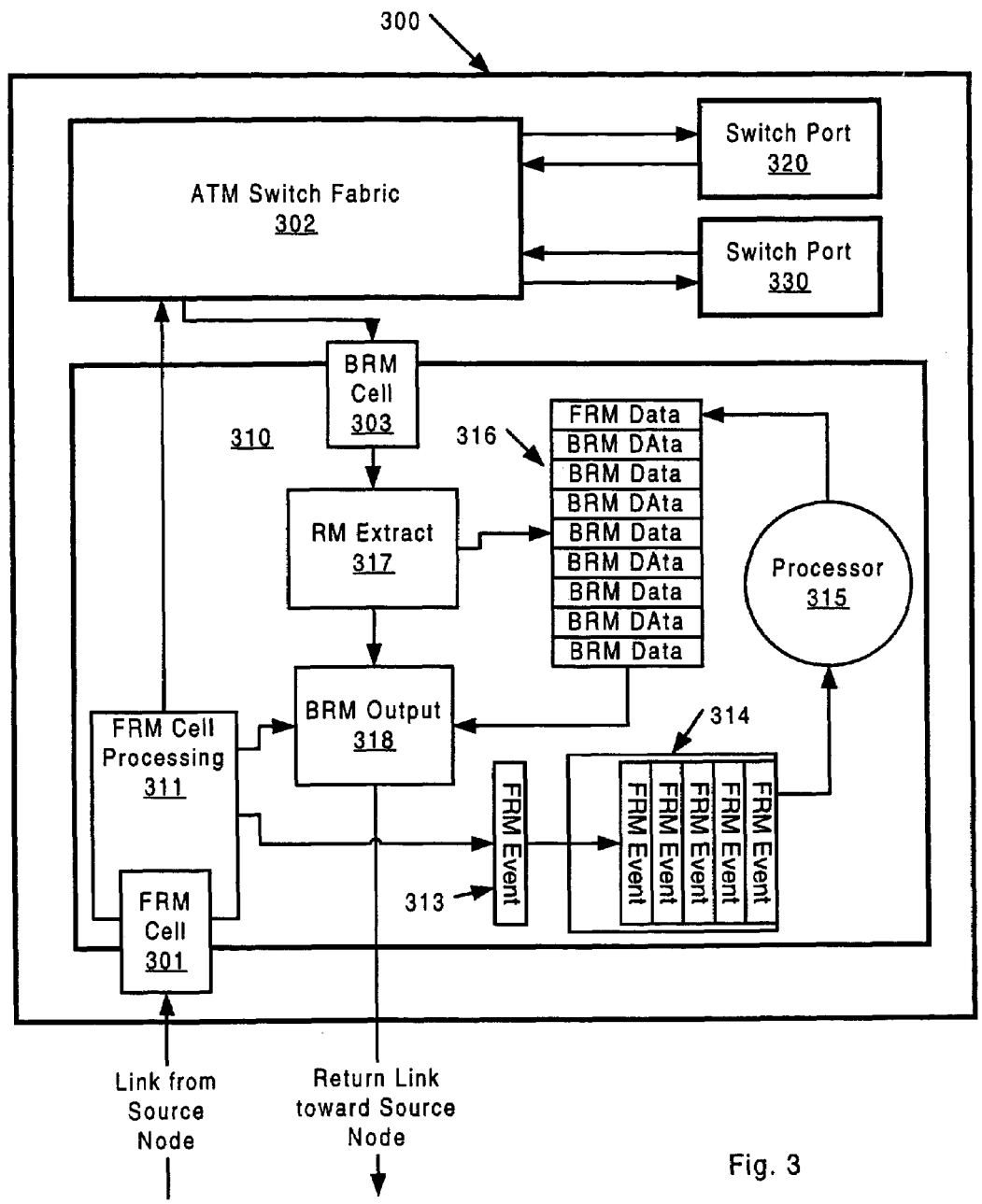
FIG. 3 illustrates an ATM switch.

FIG. 3 illustrates a multicasting ATM switch 300 with BRM cell regulation features. The switch 300 has three ports 310, 320, 330 connecting physical communication links to the switch 300. ATM cells sent to or from a port 310, 320, or 330 are processed by port circuitry and may be switched among ports by switching fabric 302. Each port includes, among other things, circuitry to process FRM 301 and BRM 303 cells. The processing circuitry of port 310 is shown in detail and includes circuit elements 311–318. Ports 320, 330 may include circuitry similar to the circuitry of port 310 or, in a shared implementation, ports 320 and 330 may share one or more elements of circuitry 311–318 with port 310. For example, the processor 315 may be shared by all of the ports 310, 320, 330.

Port circuitry 310 can regulate the number of BRM cells sent over a source virtual circuit by aggregating resource management data received from related destination virtual circuits. A port 310 may receive a single FRM cell from a source virtual circuit. The FRM cell may be multicast by switch fabric 302 over each of a dozen destination virtual circuits. As a result, the port 310 may subsequently receive a dozen responding BRM cells (one per multicast destination virtual circuit). Data from the dozen BRM cells is aggregated into a reduced number of BRM cells and the reduced number of BRM cells is sent back over the source virtual circuit toward the source node.

In one embodiment, the ratio of FRM to BRM cells may be substantially constant. To maintain a substantially constant ratio of FRM and BRM cells over a source virtual circuit, FRM cell processing circuitry 311 can send a FRM cell count signal and VCI/VPI information to BRM output circuit 318 upon receiving a FRM cell. In response, output circuit 318 may increment a cell counter associated with the source virtual circuit. When the cell counter is at or above a threshold value, BRM cells received at output circuitry 318 are sent on the source virtual circuit and the cell counter is decremented by a predetermined value. On the other hand, if the cell counter is below the threshold value, BRM cells received at the output circuitry 318 may be discarded. In a single-bit implementation, the cell counter has a value of either zero or one; other maximum cell counter values may be used depending on memory space, circuitry complexity, and other implementation factors.

In a time-based implementation, BRM cell data may be aggregated over a predetermined time period or based on the period between FRM cells. If FRM cells arrive at the circuitry 311 over a source virtual circuit at an average rate of one every $T_{FRM}$ seconds, the output circuitry 318 may regulate the return of BRM cells so that BRM cells are returned over that source virtual circuit at an average rate of one every $T_{FRM}$ seconds. Aggregation schemes also may consider the degree to which BRM cell data has changed. The aggregation time period or period between BRM cell transmission can be shortened during periods of greater resource management data fluctuation. Other aggregation schemes also may be used.

In general, to prevent data loss over destination virtual circuits, the resource management data returned in BRM cells will indicate a data rate compatible with the most restrictive (lowest capacity) destination virtual circuit. The switch 300 may maintain a database 316 storing resource management information for each destination virtual circuit. When a BRM cell is received at the port 310, data extraction circuitry 317 examines the BRM cell's VPI/VCI data and can modify or create a record (a "BRM record") in the database 316 that corresponds to the cell's destination virtual circuit. The BRM record can be used to store traffic management values that are created or updated based on the CI, NI, and/or ER fields in the BRM cell.

Data stored in BRM records in the database 316 can be used by the output circuitry 318 to determine the resource management information sent on a source virtual circuit toward a source node. When a BRM cell is to be sent on a source virtual circuit, the output circuitry 318 queries the database 316 for BRM records associated with the source virtual circuit. If the source virtual circuit is multicast over three destination virtual circuits, three BRM records may be returned in response to the query. The output circuitry 318 may compare BRM record data to determine the appropriate CI, NI, and/or ER field data to be included in a BRM cell. The output circuitry 318 may then generate or modify a BRM cell to transport the determined data on the source virtual circuit. The output circuitry 318 can determine resource management information to be included in a BRM cell based on the lowest indicated explicit rate in the collection of BRM records, by setting CI to indicate congestion when any of the BRM records indicates congestion, and by setting the NI field to indicate "no increase" when any BRM record indicates "no increase."

The database 316 also may include a FRM record. A FRM Record stores resource management information that reflects traffic conditions from the source node to the switch 300 on the source virtual channel. A FRM record can include data in substantially the same format as that in a BRM record. The processing of FRM records may be substantially identical to that of BRM records. Thus, when the output circuitry 318 queries the database 316 for records associated with a particular source virtual circuit, the FRM record as well as all BRM records associated with that source virtual circuit will be returned to the output circuitry 318. The output circuitry 318 may then treat the data in the FRM record in substantially the same manner as data in BRM records. If the FRM record indicates a lower ER value than any of the BRM records, then the ER value in the FRM record can be included in BRM cells sent from the output circuitry 318 over a source virtual circuit.

The data in a FRM record may be calculated by a resource management algorithm based on the processing of FRM cells. For example, based on the number of FRM cells received at the switch 300, a resource management algorithm can calculate how may data cells are being sent from a source node. Furthermore, the resource management algorithm may consider multiple source and destination virtual circuits when determining FRM record values. Consideration of multiple'source and destination virtual circuits may allow the switch 300 to determine resource management values for a particular source virtual circuit based on the utilization of the particular physical link over which the source virtual circuit is carried. FRM record data can be calculated based on processing of FRM cells. U.S. Pat. No. 5,633,859 and U.S. Pat. No. 5,805,577 to Jain et al. disclose resource management algorithms that may directly, or with modification, be used to calculate FRM and/or BRM record data. Implementations may use other resource management algorithms.

Implementations may use different combinations of circuit elements to achieve the functionality described with respect to circuits 311–318. For example, a software controlled processor coupled to the switching fabric 302 may receive ERM and BRM cells from the switching fabric 302, increment and decrement cell counters associated with source virtual channels, maintain a database stored in memory, delete excess BRM cells, and determine the contents of BRM cells sent toward source nodes over source virtual channels. Database 316 may be implemented in contents addressable memory (CAM) with locations that are accessed based on VCI/VPI data values. In a CAM implementation, a database query may include asserting a VCI/VPI value as a CAM memory input to receive resource management data. The database 316 also may be implemented in a random access memory, or in data storage means such as a hard disk drive.

The invention may be implemented using digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method, comprising:
   storing network flow information for a first packet received from a first network portion and storing network flow information for other packets received from other network portions associated with the first network portion in one or more database records associated with the first network portion;
   querying the database for network flow information associated with the first network portion; and
   aggregating the network flow information associated with the first network portion from other network portions in an aggregate packet.

2. The method of claim 1, further comprising transmitting the aggregate packet on the first network portion.

3. The method of claim 1, further comprising:
   receiving a plurality of packets from the first network portion with an average time interval between packets equal to T;
   receiving the first packet; and
   aggregating the network flow information associated with the first network portion in an aggregate packet at a time T after the first packet is received.

4. The method of claim 1, further comprising:
   receiving the first packet;
   incrementing a counter based on receiving the first packet from the first network portion; and
   aggregating the network flow information associated with the first network portion in an aggregate packet when the counter is at or above a threshold value.

5. The method of claim 4, further comprising:
   transmitting the aggregate packet on the first network portion; and
   decrementing the counter based on transmitting the aggregate packet on the first network portion.

6. The method of claim 1, wherein the first network portion is a source virtual circuit.

7. The method of claim 6, wherein the first packet is a forward flow control packet including flow information for the source virtual circuit and wherein the other packets associated with the first network portion are backward flow control packets including flow information for a plurality of destination virtual circuits associated with the source virtual circuit.

8. The method of claim 1, wherein the first network portion includes a network device that generates the first packet.

9. The method of claim 8, wherein the first network portion further includes at least one of a switch and a router.

10. The method of claim 1, wherein the other packets associated with the first network portion include network flow information for the other network portions, the other network portions associated with multicast packets based on the first packet.

11. A network device, comprising:
circuitry to extract network flow information from a first packet received from a first network portion and from other packets received from other network portions associated with the first network portion, the circuitry further to create one or more database records associated with the first network portion to store at least a portion of the network flow information, the circuitry further to generate an aggregate packet including network flow information associated with the first network portion from other network portions retrieved from the database.

12. The device of claim 11, wherein the circuitry further includes a counter, and wherein the circuitry is to increment the counter in response to receiving the first packet.

13. The device of claim 12, wherein the circuitry is further to transmit the aggregate packet on the first network portion, and wherein the circuitry is further to decrement the counter in response to at least one of generating the aggregate packet and transmitting the aggregate packet.

14. The device of claim 11, wherein the circuitry is further to generate the aggregate packet at a time T after receiving the first packet, wherein the time T is an average time between receiving packets from the first network portion.

15. An article comprising a machine-readable medium storing instructions operable to cause one or more machines to perform operations comprising:
storing network flow information for a first packet received from a first network portion and network flow information for other packets received from other network portions associated with the first network portion in one or more database records associated with the first network portion;
querying the database for network flow information associated with the first network portion; and
aggregating the network flow information associated with the first network portion from other network portions in an aggregate packet.

16. The article of claim 15, wherein the operations further comprise transmitting the aggregate packet on the first network portion.

17. The article of claim 15, wherein the operations further comprise:
receiving a plurality of packets from the first network portion with an average time interval between packets equal to T;
receiving the first packet; and
aggregating the network flow information associated with the first network portion in an aggregate packet at a time T after the first packet is received.

18. The article of claim 15, wherein the operations further comprise:
receiving the first packet;
incrementing a counter based on receiving the first packet from the first network portion; and
aggregating the network flow information associated with the first network portion in an aggregate packet when the counter is at or above a threshold value.

19. The article of claim 18, wherein the operations further comprise:
transmitting the aggregate packet on the first network portion; and
decrementing the counter based on transmitting the aggregate packet on the first network portion.

20. The article of claim 15, wherein the first network portion is a source virtual circuit.

21. The article of claim 20, wherein the first packet is a forward flow control packet including flow information for the source virtual circuit and wherein the other packets associated with the first network portion are backward flow control packets including flow information for a plurality of destination virtual circuits associated with the source virtual circuit.

22. The article of claim 15, wherein the first network portion includes a network device that generates the first packet.

23. The article of claim 22, wherein the first network portion further includes at least one of a switch and a router.

24. The article of claim 15, wherein the other packets associated with the first network portion include network flow information for the other network portions, the other network portions associated with multicast packets based on the first packet.

* * * * *